S. A. McGill,
Vegetable Grater,
No. 53,021.            Patented Mar. 6, 1866.
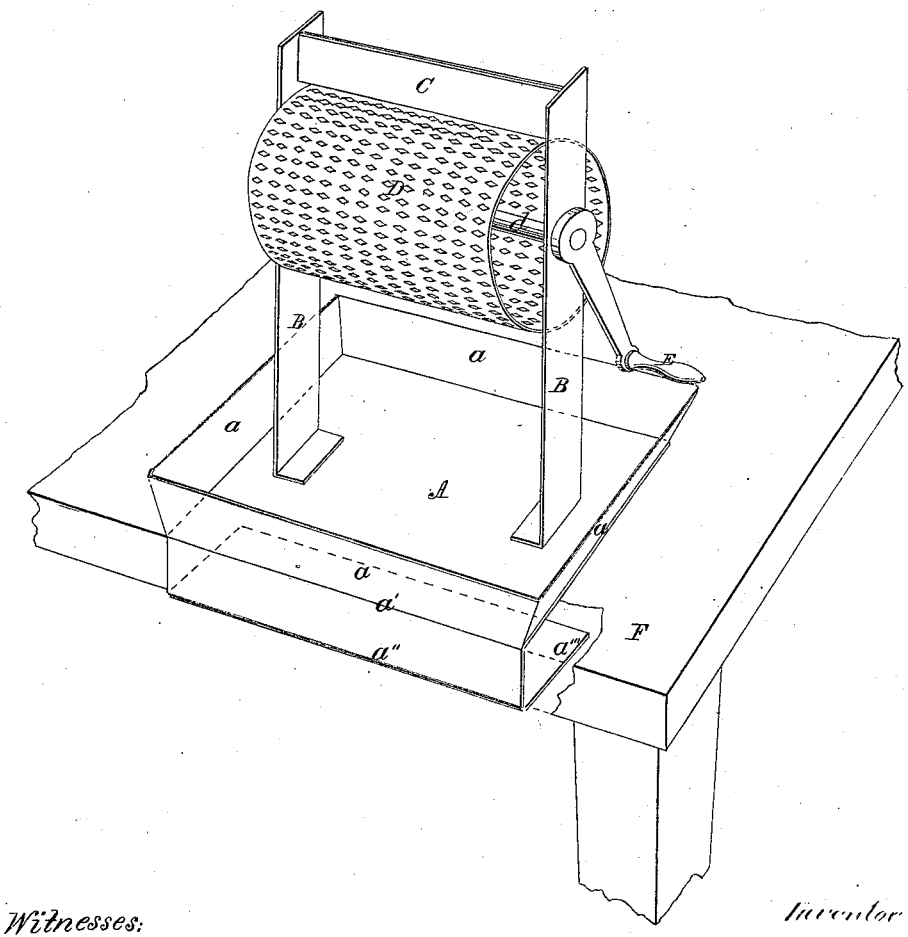
Witnesses:
Inventor

UNITED STATES PATENT OFFICE.

SARAH A. McGILL, OF CINCINNATI, OHIO.

VEGETABLE-GRATER.

Specification forming part of Letters Patent No. 53,021, dated March 6, 1866.

*To all whom it may concern:*

Be it known that I, SARAH A. MCGILL, of Cincinnati, Hamilton county, and State of Ohio, have invented a new and useful Improvement in Revolving Graters, of which the following is a full and clear description thereof, reference being had to the accompanying drawings, which form part of this specification.

My invention relates to a revolving cylindrical grater pivoted in a frame, which may be attached to a table or sideboard.

The accompanying drawing represents a perspective view of my improved grater attached to a table.

A is a dish having the sides $a$ flaring. The bottom plate of dish A is bent at right angles at the front face of the dish in the line $a'$. The leaf $a'''$ is turned about the edge $a''$ less than a right angle. From dish A rise standards B, at the top of which, and rigidly secured to them, is the retaining-plate C. Directly beneath plate C, and pivoted in the standards B, is the revolving cylindrical grater D. The axis $d$ has at one end, exterior to the standard, the crank-handle E. The leaf $a'''$ passes beneath the edge of table F. The distance between the line $a'$ and edge $a''$ is equal to the thickness of the board forming the top of a table.

Operation: The root or spice to be grated is held firmly against the retaining-plate C. The cylindrical grater D is revolved by application of power to crank-handle E. The result from this operation is retained in dish A until such an amount has accumulated as is desired. The entire machine may then be removed from the table and the contents of dish A emptied into any desirable receptacle.

When it is necessary to grate aromatic roots or herbs a distance from the grater is desirable. My improved grater enables the operator to successfully use the grater without being inconvenienced by unpleasant odor. Its construction, which peculiarly adapts it for general use upon kitchen furniture, recommends it as a useful article in domestic economy.

Having described my improved grater, its operation and utility, I make the following claim, which I desire to secure by Letters Patent—

The combination of the aforesaid grater D, the retaining-plate C, with standards B B, and dish A, with the retaining-leaf $a'''$, the whole arranged and combined substantially in the manner and for the purpose herein set forth.

SARAH ANN McGILL.

Attest:
WM. DOZGEN,
LIZZIE MCGILL.